United States Patent [19]
Kato

[11] Patent Number: 5,233,960
[45] Date of Patent: Aug. 10, 1993

[54] ENGINE IGNITION TIMING ADJUSTMENT DEVICE

[75] Inventor: Hideki Kato, Shizuoka, Japan

[73] Assignee: Sanshin Kogyo Kabushiki Kaisha, Shizuoka, Japan

[21] Appl. No.: 884,766

[22] Filed: May 18, 1992

[30] Foreign Application Priority Data

May 17, 1991 [JP] Japan ................... 3-140658

[51] Int. Cl.⁵ .................................................. F02P 5/00
[52] U.S. Cl. ...................................... 123/414; 123/612
[58] Field of Search ........ 123/149 C, 149 D, 146.5 R, 123/146.5 A, 414, 612, 613, 617

[56] References Cited

U.S. PATENT DOCUMENTS

| | | | |
|---|---|---|---|
| 2,902,553 | 9/1959 | Bensinger | 123/146.5 R |
| 3,776,211 | 12/1973 | Droke et al. | 123/146.5 R |
| 3,915,131 | 10/1975 | Bzungsberg | 123/414 |
| 4,848,298 | 7/1989 | Schleupen | 123/617 |
| 4,850,323 | 7/1989 | Ricordi | 123/617 |
| 4,953,531 | 9/1990 | Abe | 123/414 |

OTHER PUBLICATIONS

1981 Ford Car Shop Manual, Aug. 1980, p. 23-01-7.

Primary Examiner—E. Rollins Cross
Assistant Examiner—Thomas Moulis
Attorney, Agent, or Firm—Bacon & Thomas

[57] ABSTRACT

An engine timing adjustment device is disclosed having a rotating member which rotates integrally with the crankshaft and which has ignition timing indicia on its surface. The device further has a timing pointer wherein the position of this pointer relative to the cylinder body of the engine is fixed such that the position of the ignition timing adjustment indicia on the rotating member with respect to the timing pointer corresponds to the piston displacement for a desired ignition timing. The rotating member may be a flywheel affixed directly to the crankshaft such that it may be assembled to the crankshaft only in a position in which the ignition timing indicia is in the proper desired relationship with the crankshaft throws and, therefore, the piston displacement.

10 Claims, 3 Drawing Sheets

ENGINE IGNITION TIMING ADJUSTMENT DEVICE

BACKGROUND OF THE INVENTION

This invention relates to an ignition timing adjustment device for an engine, more particularly such a device which simplifies the construction and assembly of the engine.

In internal combustion engines, it is important that the ignition timing (the point during the crankshaft rotation at which the sparkplug fires) be accurately established in order to insure optimum engine performance. Typically, a rotating member, such as a flywheel or a camshaft sprocket driven by the crankshaft, have alignment marks or holes formed adjacent to their peripheries. A timing plate having an indicator member is fixed in position and the ignition timing may be adjusted by visually observing the indicator member and the alignment marks with a timing light. In the actual adjustment of the timing, the piston displacement in its cylinder is checked using a dial gauge to establish a top dead center (TDC) position. The flywheel or camshaft sprocket is then positioned based upon the measurements obtained using the dial gauge. Next, the position of the timing plate is determined and the timing plate is fixed into place. The ignition distributor is rotated until the correct positional relationship between the timing plate indicator and the alignment marks or holes is obtained.

In the prior art, the use of a dial gauge to determine the piston displacement for the engine ignition timing is time consuming and detracts from productivity during the assembly of the engine. In addition, the position of the timing plate must be determined, thereby further slowing down the assembly operation and lengthening the amount of time required for timing adjustment.

SUMMARY OF THE INVENTION

The object of this invention is to provide an engine ignition timing adjustment device which greatly simplifies the timing adjustment process.

This object is attained by providing an engine timing adjustment device having a rotating member which rotates integrally with the crankshaft and which has ignition timing indicia on its surface. The device according to the invention further has a timing pointer wherein the position of this pointer relative to the cylinder body of the engine is fixed such that the position of the ignition timing adjustment indicia on the rotating member with respect to the timing pointer corresponds to the piston displacement for a desired ignition timing. The rotating member may be a flywheel affixed directly to the crankshaft such that it may be assembled to the crankshaft only in a position in which the ignition timing indicia is in the proper desired relationship with the crankshaft throws (and, therefore, the piston displacement).

Since the position of the timing pointer is fixed relative to the cylinder body of the engine, when the ignition timing adjustment indicia are positioned such that a predetermined indicia is in alignment with the timing pointer, the proper ignition advance angle is established. Thus, the invention eliminates the necessity of using a dial gauge to establish the piston displacement and renders it unnecessary to rotate the distributor to establish the proper ignition timing advance. Furthermore, since the timing pointer is fixed, no time need be spent adjusting its position relative to the cylinder body. The present invention greatly simplifies the timing adjustment operation during engine assembly.

DETAILED DESCRIPTION OF THE PREFERRED EMBODIMENT

Figure 2:
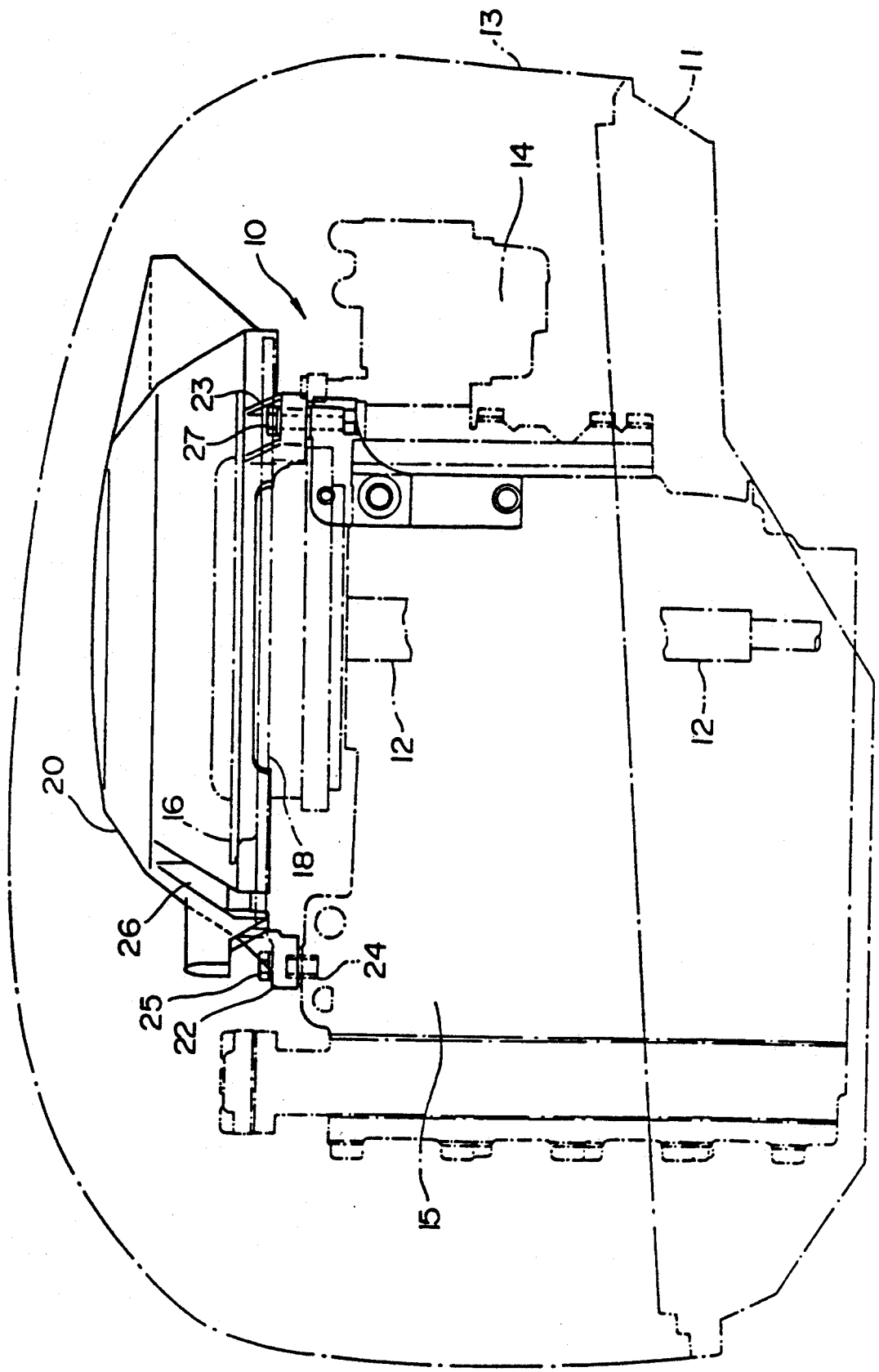
FIG. 2 is a partial, side view of the outboard marine engine of FIG. 1 utilizing the ignition timing adjustment device according to this invention.

FIG. 2 shows an outboard marine engine including the ignition timing adjustment device according to this invention. The engine unit 10 is enclosed by a bottom cowl 11 and a top cowl 13. The engine unit 10 is composed of a crankcase 14 and a cylinder body 15. Inside the cylinder body 15 is a crankshaft 12 which rotates about a generally vertically extending axis. Reciprocating pistons (not shown) are connected in known fashion to the crankshaft 12 to cause its rotation.

Attached to the upper end of the crankshaft 12 is a flywheel 16 which may also comprise a magnet. Ring gear 18 is attached to and is disposed around the circumference of flywheel 16. Ring gear 18 may be engaged by a starter (not shown) in order to start the engine. Flywheel 16 and ring gear 18 are covered by starter casing 20.

Figure 3:
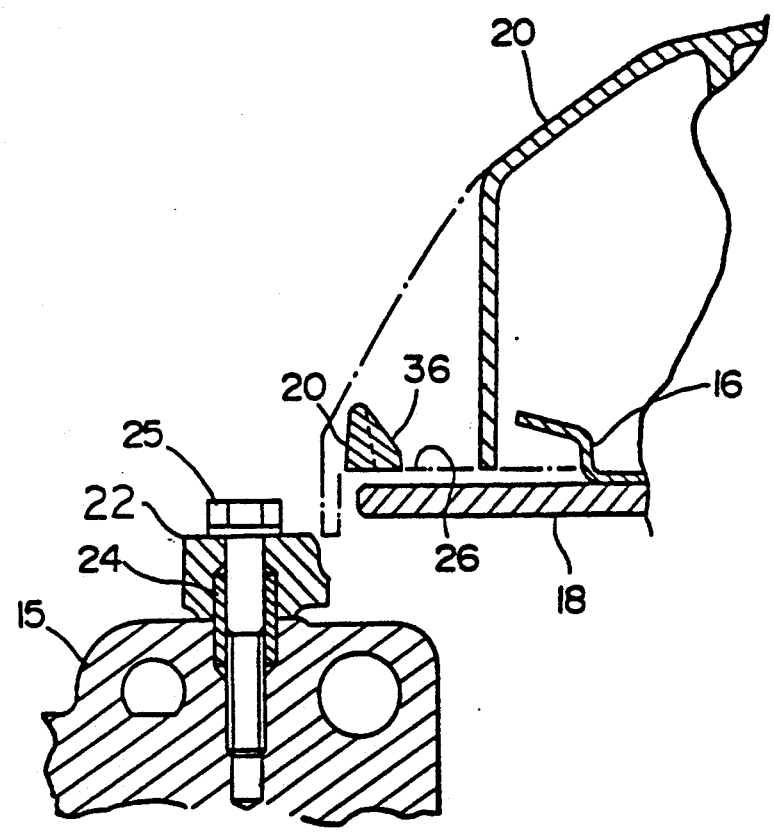
FIG. 3 is a cross-sectional view taken along line III—III in FIG. 1.

As can be seen in the figures, starter casing 20 has flanges 22 and 23 extending therefrom which are used to attach the starter casing 20 to the crankcase 14 and the cylinder body 15. Rear flange 22 defines a hole therethrough and a corresponding hole is defined by cylinder body 15, as best illustrated in FIG. 3. A positioning sleeve 24, which may be a hollow sleeve, serves as the locating means to properly locate the starter casing 20 with respect to the cylinder body 15. Positioning sleeve 24 extends into the hole defined by the cylinder body 15, as well as the hole defined by the rear flange 22. A threaded attaching member, such as bolt 25, extends through the hole defined by flange 22, through the positioning sleeve 24, and threadingly engages the cylinder body 15. The bolt 25 and the positioning sleeve 24 thereby serve to attach and to accurately locate the starter casing 20 with respect to the cylinder body 15.

Flange 23 defines a similar hole to accommodate a bolt 27, however, it need not define a hole to accommodate a positioning pin. The bolts 25 and 27 determine the position of the starter casing 20 relative to the cylinder body 15 and serve to attach it to the cylinder body.

Figure 1:
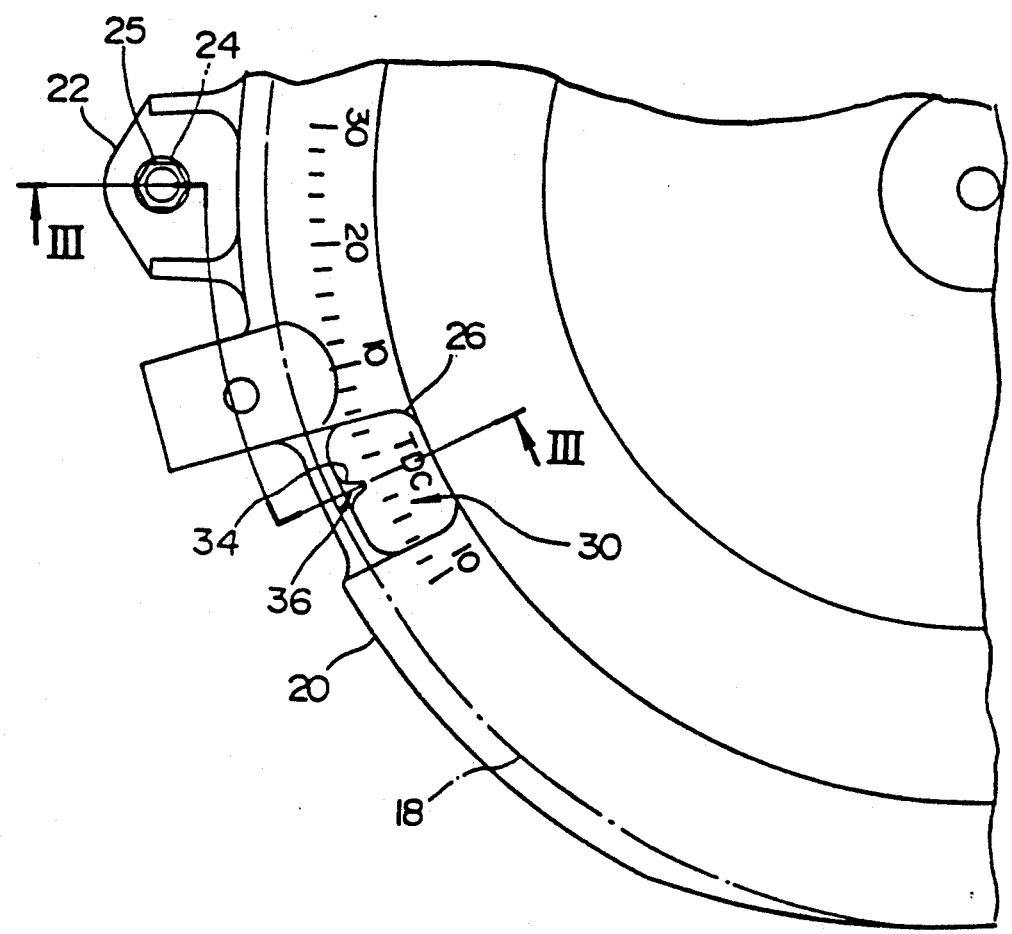
FIG. 1 is a partial, top view of an outboard marine engine incorporating the ignition timing adjustment device according to this invention.

The starter casing 20 defines a window 26 and has a timing pointer 34 with a timing alignment mark 36 extending therefrom into the window 26. If only a single positioning sleeve 24 is utilized, the window 26 and the timing pointer 34 should be located adjacent to the positioning pin, as illustrated in FIG. 1. When the starter casing is in its attached position, the ring gear 18 is visible through the window 26 such that the ignition timing indicia 30 may be observed through the window 26.

The starter casing 20 uses the positioning sleeve 24 so that it may be accurately positioned with respect to the cylinder body 15 in the vicinity of flange 22. The positioning sleeve 24 also allows the adjacent timing pointer 34 formed in the starter casing window 26, which may have alignment mark 36, to be accurately positioned relative to the cylinder body.

The flywheel 16 with the ring gear 18 may be attached to the crankshaft 12 with a key/keyway connection so that the flywheel and crankshaft are assembled in a proper angular relationship. A key groove may be formed in both the crankshaft 12 and the hub of the flywheel/ring gear assembly and, in known fashion, a key may be inserted into these aligned grooves. Accordingly, when the flywheel/ring gear assembly is attached to the crankshaft 12, the assembly is oriented in the proper position to indicate the top dead center position of at least one of the pistons attached to the crankshaft. This top dead center (TDC) position may be part of the ignition timing indicia, as illustrated in FIG. 1.

When these components are assembled within the cylinder body 15 and the starter casing 20 is attached thereto, the proper timing setting relative to the top dead center position of the piston may be ascertained merely by aligning the TDC mark on the ring gear 18 with the alignment mark 36 on the timing pointer 34. Since the timing pointer 34 is accurately located and fixed relative to the cylinder body 15, there is no need to utilize a gauge to determine the position of the piston, nor is there any necessity to adjust the position of a timing plate. Even if the engine is disassembled, subsequent reassembly will automatically reposition the parts in their correct positions.

The result is that the operation of adjusting the ignition timing advance angle using a dial gauge to determine the piston displacement for positioning the flywheel is no longer required. This greatly reduces the work required to achieve the ignition timing advance angle adjustment during the engine production process. The indicator pointer 34, which corresponds to the timing plate of the prior systems, is also accurately and fixedly positioned with respect to the cylinder body, thereby eliminating the need for timing plate adjustment.

The starter casing 20 may be accurately positioned relative to the cylinder body using one positioning sleeve 24. Accurate positioning of the timing pointer 34 is accomplished if the window 26 with the timing pointer 34 is located adjacent to the positioning sleeve 24 to reduce the possible slippage of the pointer position to an absolute minimum. However, if positioning sleeves are utilized in all of the attachment points for the starter casing 20, the window 26 containing the timing pointer 34 may be located at a greater distance from the positioning pins 24. The use of a plurality of positioning sleeves 24 would assure the accurate positioning and location of the starter casing 20 with respect to the cylinder body 15.

It is within the scope of this invention to utilize positioning means other than a positioning sleeve and the window which allows the ignition timing indicia to be observed may be formed in another engine component besides the starter casing. A separate timing plate could also be used with a positioning means, such as a positioning pin.

The foregoing description is provided for illustrative purposes only and should not be construed as in any way limiting this invention, the scope of which is defined by solely by the appended claims.

I claim:

1. An ignition timing adjustment device for an engine having a cylinder body in which at least one reciprocating piston rotates a crankshaft about an axis comprising:
    a) a rotating member operatively associated with the crankshaft so as to rotate therewith;
    b) ignition timing indicia located on the rotating member;
    c) timing pointer means comprising: a casing defining an opening through which the ignition timing indicia is visible; and a timing pointer extending from the casing into the opening; and,
    d) locating means to locate the timing pointer relative to the cylinder body and adjacent to the rotating member such that, when a predetermined ignition time indicia is aligned with the timing pointer, the rotating member, crankshaft and at least one piston are properly positioned relative to the cylinder body for a desired ignition timing.

2. The ignition timing adjustment device of claim 1 wherein the locating means also attaches the casing to the cylinder body.

3. The ignition timing adjustment device of claim 1 further comprising at least one flange extending from the casing, the at least one flange defining a hole therein.

4. The ignition timing adjustment device of claim 3 wherein the cylinder body defines a second hole and wherein the locating means comprises a locating member extending into the hole defined by the at least one flange and the second hole.

5. The ignition timing adjustment device of claim 4 wherein the locating member comprises a hollow sleeve.

6. The ignition timing adjustment device of claim 5 further comprising a fastener extending through the at least one flange and the hollow sleeve, and engaging the cylinder body so as to attach the casing to the cylinder body.

7. The ignition timing adjustment device of claim 6 wherein the fastener is a threaded fastener threadingly engaging the cylinder body.

8. The ignition timing adjustment device of claim 1 wherein the timing pointer is located adjacent to the locating means.

9. The ignition timing adjustment device of claim 1 wherein the rotating member is a flywheel.

10. The ignition timing adjustment device of claim 9 further comprising means to fixedly attach the flywheel to the crankshaft.

* * * * *